No. 807,733. PATENTED DEC. 19, 1905.
C. A. EICKELBERG.
MOVABLE LANDING FOR THE CAGES OR CORVES IN MINE SHAFTS.
APPLICATION FILED AUG. 23, 1905.
Fig. 1.
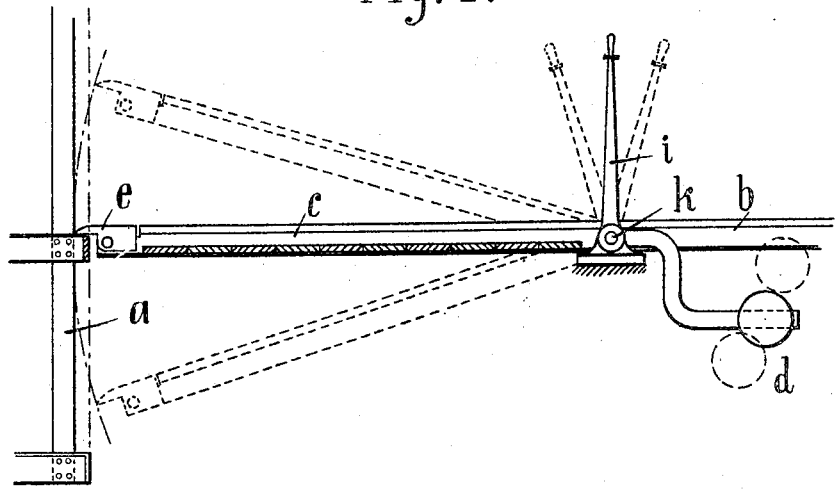
Fig. 2.
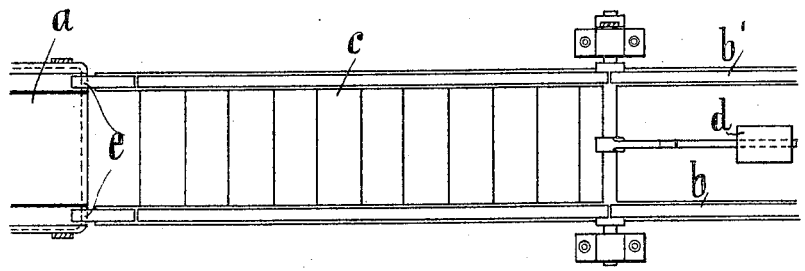
Fig. 3. Fig. 5. Fig. 4.
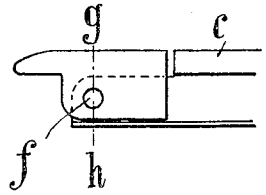  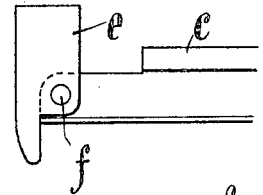
Witnesses
Chas H. Smith
Leopold Lee
Inventor
Carl A. Eickelberg.
per Harold Serrell
atty.

UNITED STATES PATENT OFFICE.

CARL AUGUST EICKELBERG, OF WERNE, NEAR MÜNSTER, GERMANY.

MOVABLE LANDING FOR THE CAGES OR CORVES IN MINE-SHAFTS.

No. 807,733.  Specification of Letters Patent.  Patented Dec. 19, 1905.

Application filed August 23, 1905. Serial No. 275,365.

*To all whom it may concern:*

Be it known that I, CARL AUGUST EICKELBERG, a subject of the German Emperor, residing at Werne, near Münster, Westphalia, in the Empire of Germany, have invented certain new and useful Improvements in Movable Landings for the Cages or Corves in Mine-Shafts, of which the following is a specification.

In systems of lifts for raising loads in mines from the pit-eye or from main or intermediate levels using cages having several decks the exact adjustment of the latter to the track at the landings is often found very difficult. Since the weight of the load to be placed on the cage is sometimes greater and sometimes less, different elongations of the winding-rope consequently result, and this is more especially the case at great depths of the shaft. Under these conditions it is impossible for the attendant at the winding-engine to stop the several decks of the cage exactly opposite the stationary track at the pit-eye or other loading place, over which track loaded corves, trucks, or the like pass into the cage and empty corves, trucks, or the like are passed out of the cage back to the place where they are to be filled. In order under such circumstances to obtain a practicable traversable junction between the tracks on the decks of the cage and the stationary track at the pit-eye or other loading place, the movable landing forming the subject of this invention has been constructed. This landing is fixed to a rotatable shaft provided with an adjusting-lever, which shaft at the place at which the joint between the rails of the landing and those of the stationary track occurs is supported in bearings in such a manner that the landing can be tilted at an angle both upward and downward to the track-level and can adjust itself in order that even with considerable deviation from the normal in the position of the cage a traversable junction with the stationary track can be obtained.

Figure 1 shows a side elevation of the movable landing, and Fig. 2 a plan thereof. Figs. 3 and 4 are side elevations, drawn to an enlarged scale, showing two positions of a joint-piece provided at the ends of the rails next to the shaft; and Fig. 5 is a section on the line $g\ h$, Fig. 3.

The pivot-shaft $k$, which is provided with a hand-lever $i$, is mounted in bearings at the place where the joint between the rails of the landing and the rails $b\ b'$ of the track of the level or other loading-place occurs, and a landing-frame $c$ is secured to the pivot-shaft $k$.

The arrangement of the pivot-shaft is such that the landing can be swung at an angle to the track-level both upward and downward and can set itself as indicated in dotted lines, Fig. 1. With this arrangement, even when there is considerable deviation from the normal in the position of the cage $a$, hanging freely in the shaft, an effective traversable junction with the stationary track is obtained. The landing is provided with suitable rails, forming a continuation of the fixed track, and the weight of the landing is balanced as far as possible by a counterweight $d$, mounted on an arm secured to the pivot-shaft in order to facilitate the adjustment thereof. The outer ends of the rails on the landing are provided with pawl-like joint-pieces $e$, pivotally mounted therein on bolts or pins $f$. The pieces $e$ are provided with projections adapted to rest on the edge of the cage or lift, and it will be apparent that said pieces $e$ may be tilted in order to permit an unimpeded passage of the cage during its downward travel, even when a normal adjustment of the landing is not obtained, while in the upward travel of the cage the landing itself swings upward and swings back again by gravity after the passage of the said cage.

I claim as my invention—

1. A movable landing for cages or corves in mines, comprising a landing-frame bearing the track for the corves, trucks or the like, a pivotal axis at one end of said landing-frame, means for supporting said axis, and a counterweight and a lever connected to said frame.

2. A movable landing for cages or corves in mines, comprising a landing-frame, rails on said landing-frame, a pivotal axis at one end of said landing-frame, means for supporting said axis, pivotal pawl-like joint-pieces on the outer or free ends of said rails, and a counterweight and a lever connected to said frame.

3. A movable landing for mine-lifts, comprising a landing, a shaft to which the landing is secured, a counterweight secured to said shaft, and means at the outer end of said platform for engaging the lifts.

4. A movable landing for mine-lifts, comprising a landing, a shaft to which the landing is secured, a counterweight secured to said shaft, means at the outer end of said platform for engaging the lifts, and means whereby the aforesaid means may be turned to permit the free vertical movements of the lifts.

5. A movable landing for mine-lifts comprising a landing, a shaft to which the landing is secured, a counterweight secured to said shaft, and pivotally-mounted end pieces on the outer extremity of said platform adapted to engage the lifts and also to be turned by contact to permit the free descent of the lifts.

In testimony whereof I have hereunto set my hand in presence of two subscribing witnesses.

CARL AUGUST EICKELBERG.

Witnesses:
   OTTO KÖNIG,
   J. A. RITTERSHAUS.